United States Patent [19]

Nakamura et al.

[11] Patent Number: 4,856,027
[45] Date of Patent: Aug. 8, 1989

[54] CARRIER RECOVERY PHASE-LOCKED LOOP

[75] Inventors: Shigeki Nakamura, Kawasaki; Yasufumi Takahashi, Yokohama, both of Japan

[73] Assignee: Hitachi, Ltd., Tokyo, Japan

[21] Appl. No.: 173,652

[22] Filed: Mar. 24, 1988

[30] Foreign Application Priority Data

Mar. 24, 1987 [JP] Japan .................................. 62-68060

[51] Int. Cl.⁴ .......................................... H04L 27/22
[52] U.S. Cl. ..................... 375/81; 329/104; 375/97
[58] Field of Search ............ 375/39, 52, 77, 81, 375/83, 86, 97; 329/50, 104, 110, 124

[56] References Cited

U.S. PATENT DOCUMENTS

| | | | |
|---|---|---|---|
| 4,600,889 | 7/1986 | Rugen | 329/104 |
| 4,604,583 | 8/1986 | Aoyagi et al. | 375/81 |
| 4,631,485 | 12/1986 | Torelli et al. | 329/50 |
| 4,704,582 | 11/1987 | Dixon et al. | 375/81 |

FOREIGN PATENT DOCUMENTS 50-24062  3/1975  Japan .

OTHER PUBLICATIONS

A Generalized "Polarity-Type" Costas Loop for Tracking MPSK Signals, Oct. 1982 (8 pp.).

*Primary Examiner*—Benedict V. Safourek
*Attorney, Agent, or Firm*—Kenyon & Kenyon

[57] ABSTRACT

A carrier recovery phase-locked loop for recovering a carrier from a digitized quadrature phase shift keying modulated wave arriving on time division basis comprises a PLL circuit, first unit, responsive to the received signal, for preparing a phase comparator's characteristic adapted for a binary phase shift keying modulated wave, second unit, also responsive to the received signal, for preparing a phase comparator's characteristic adapted for the quadrature phase shift keying modulated wave and switching unit for selectively supplying output signals from the first and second units to the PLL circuit. During reception of a preamble, the carrier is recovered using the binary phase comparator's characteristic through the PLL circuit.

8 Claims, 3 Drawing Sheets

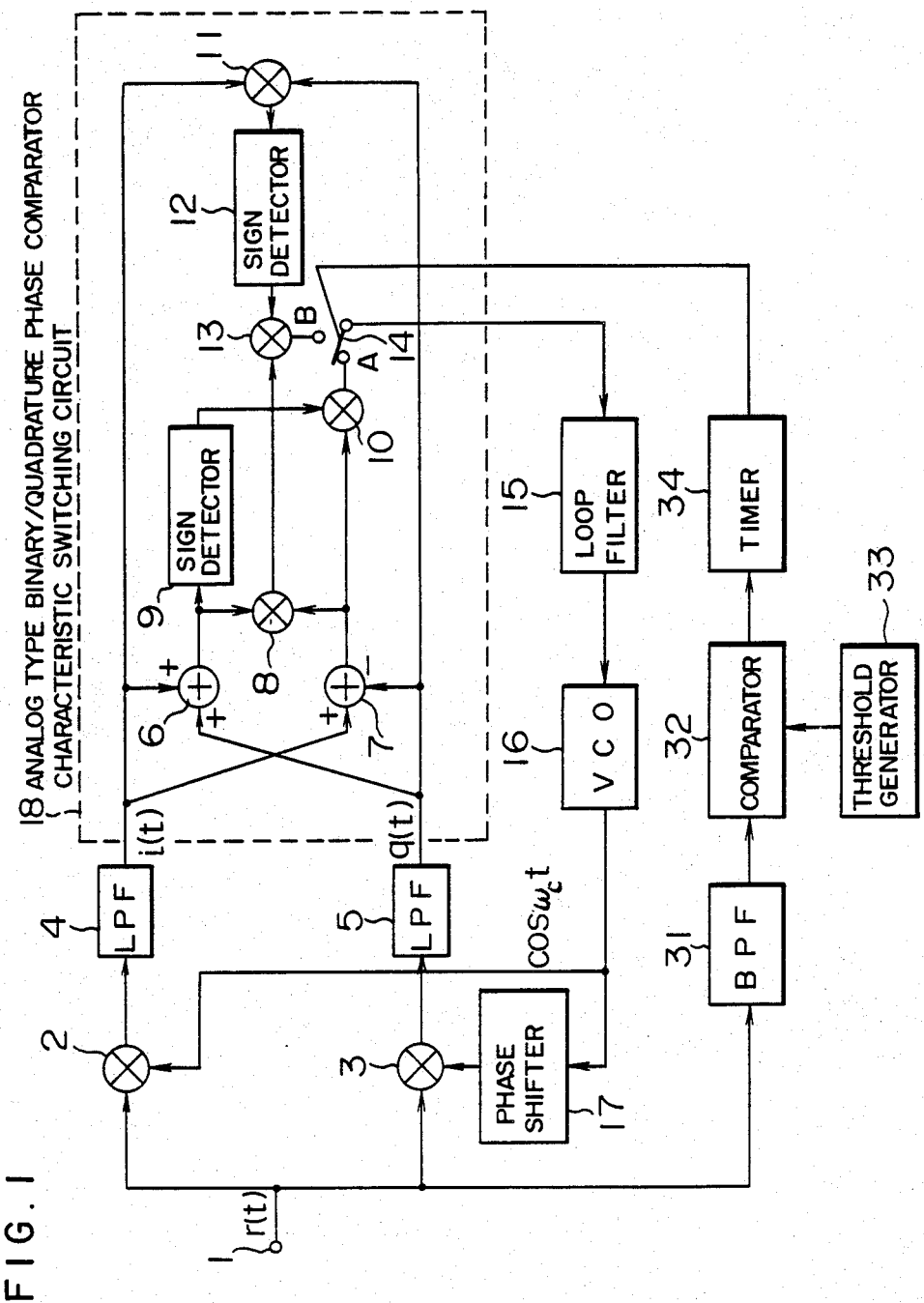
FIG. I

CARRIER RECOVERY PHASE-LOCKED LOOP

BACKGROUND OF THE INVENTION

1. Field of the Invention

This invention relates to a carrier recovery phase-locked loop for recovering a carrier from a time-divided received wave as in the case of a modulated wave in a time division multiple access scheme and more particularly to a carrier recovery phase-locked loop suitable for recovering a carrier from a digitized quadrature phase shift keying (QPSK) modulated wave.

2. Description of the Related Art

In the field of satellite communications, various multiple access schemes have been proposed from the standpoint of effective utilization of electric waves. At present, the TDMA (Time Division Multiple Access) scheme is the most promisingly applicable scheme. In the TDMA scheme, the modulated wave takes the form of a burst signal on the time axis. When TDMA type multiple access is to be effected using digitized quadrature phase shift keying, it is necessary for the receiver to recover a carrier each time a burst signal arrives. To meet this requirement, in the transmitter a preamble is added as the heading to each burst-like transmission signal and in the receiver, the carrier recovery, timing recovery and automatic gain control are synchronized within an interval of time for reception of the preamble.

In order to improve channel utilization, the duration of the preamble added as the heading to the burst-like signal is required to be short and the carrier is therefore required to be recovered at high speeds.

Further, because of the desirability of a compact antenna of small diameter for earth stations use, the recovery loop is desired to operate even with low C/N ratios (Carrier to Noise Ratios).

Furthermore, in a satellite channel in which carriers of high frequencies are used, the difference in frequency between carriers for individual received burst-like signals is large and the difference in frequency between a carrier of a received signal and the reference carrier of the receiver is also large.

For recovery of the carrier, a PLL (Phase-Locked Loop) circuit is widely used but the aforementioned requirements are contradictory, in general, to the operational performance of the PLL circuit.

As a prior art reference which can recover a carrier from a digitized burst-like phase shift keying modulated wave while maintaining minimization of the synchronization time, there is available, for example, JP-A-50-24062. In this prior art reference, a carrier corresponding to a received carrier is recovered by means of a narrow band filter substituting for a PLL circuit so that during synchronization, an input modulated wave is inverse-modulated with a fixed pattern corresponding to its preamble to ensure high speed pull-in at the heading of the burst signal.

However, the inverse-modulation of this prior art is to cancel phase shifts by using modulation components so as to provide a non-modulated wave, and therefore, the inverse-modulation must be carried out by using a pseudo-demodulation signal generated in advance of the synchronization. Accordingly, hardware for this purpose is additionally provided, raising a problem that the amount of hardware is increased. On the other hand, as the frequency offset between a received carrier and the reference carrier increases, there results a phase offset during the synchronization. To prevent the phase offset, the additional provision of an AFC (Auto-Frequency Control) loop is needed which bottlenecks realization of simplified hardware and low power consumption. In addition, the prior art loop is difficult to digitize.

SUMMARY OF THE INVENTION

An object of this invention is to provide a carrier recovery phase-locked loop for digitized quadrature phase shift keying modulated waves which can recover a carrier at high speeds.

Another object of this invention is to provide a carrier recovery phase-locked loop for digitized quadrature phase shift keying modulated waves which can operate steadily with a low C/N ratio.

Still another object of this invention is to provide a compact and low-power consuming carrier recovery phase-locked loop for digitized quadrature phase shift keying modulated waves.

In the case of the digitized quadrature phase shift keying, the preamble added as the heading to the transmission burst signal typically has non-modulated duration in which all bits are "0" or "1" and repetitive duration in which "0" and "1" are repeated, and the non-modulated duration is used for carrier recovery and the repetitive duration for timing recovery. The preamble is received in the form of a binary phase shift keying (BPSK) modulated wave which is superior to the quadrature phase shift keying modulated wave in point of noise-proof capability.

Based on this observation, the present invention uses a PLL circuit for carrier recovery and comprises first means, responsive to a received burst signal, for preparing a phase comparator's characteristic adapted for the binary phase shift keying modulated wave, second means, also responsive to the received burst signal, for preparing a phase comparator's characteristic adapted for the quadrature phase shift keying modulated wave, and switching means for selectively supplying output signals from the first and second means to the PLL circuit.

During the process in which the reference wave for carrier recovery is phase-locked to the preamble added as the heading to the received burst signal, the switching means is operatively transferred or switched to supply the phase comparator's characteristic adapted for the binary phase shift keying modulated wave to the PLL circuit and after the establishment of phase-locking, the switching means is operatively transferred or switched to supply the phase comparator's characteristic adapted for the quadrature phase shift keying modulated wave to the PLL circuit.

In this manner, both the carrier recovery and timing recovery from the preamble of short duration can steadily be effected by taking advantage of the binary phase shift keying modulated wave having superiority in noise-proof capability.

BRIEF DESCRIPTION OF THE DRAWINGS

FIG. 1 is a circuit diagram illustrating a carrier recovery phase-locked loop according to a first embodiment of the invention.

DESCRIPTION OF THE PREFERRED EMBODIMENTS

The invention will now be described by way of example with reference to the accompanying drawings.

Figures 2A, 2B, 2C:
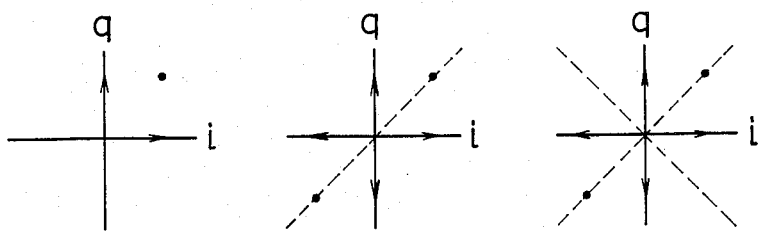
FIGS. 2A to 2C are diagrams useful in explaining constellations of the received burst signal.

To explain the concept of the present invention, reference should first be made to FIGS. 2A to 2C illustrating constellations of the quadrature phase shift keying modulated burst wave. Especially, FIG. 2A illustrates the case of the non-modulated duration of the preamble that has been added to the head of the burst signal, and in this case the constellation stays at a single position because the same data bit continues to appear in each of i-channel and q-channel. FIG. 2B illustrates the case of the repetitive duration of the preamble for timing (clock) recovery. FIG. 2B illustrates the case where the constellation shifts between two positions on the bit-by-bit basis in order to superpose timing components on the modulated wave during the repetitive duration for timing recovery. FIG. 2C illustrates the case of a usual transmission data signal which is modulated in accordance with a random pattern and which follows the preamble shown in FIGS. 2A and 2B. In this case, the constellation stays at four positions. Thus, FIGS. 2A and 2B demonstrate that during reception of the preamble, the phase comparator's characteristic adapted for recovering the carrier from the binary phase shift keying modulated wave is sufficient, and FIG. 2C demonstrates that the phase comparator's characteristic adapted for the quadrature phase shift keying modulated wave is needed for reception of the data signal.

In the carrier recovery phase-locked loop handling the quadrature phase shift keying modulated wave, the wave detected by the reference carrier of the receiver, is provided as an orthogonal signal component (i-channel and q-channel) of the base band signal. A two-component signal corresponds to a region in which the constellations shown in FIG. 2C exist.

These constellations represent the phase of the modulated carrier. In the carrier recovery loop the phase error between the reference carrier and the modulated carrier should be obtained without affect of those phase ambiguities.

The two-component signal is subjected to a predetermined calculation to provide one constellation from which an instantaneous phase difference between the received wave and the reference carrier can be obtained.

Accordingly, in accordance with the invention, means is provided for applying a predetermined calculation commensurate with the binary phase shift keying modulated wave to the two-component signal to prepare the phase comparator's characteristic adapted for the binary phase shift keying modulated wave, means is provided for applying a predetermined calculation commensurate with the quadrature phase shift keying modulated wave to the two-component signal to prepare the phase comparator's characteristic adapted for the quadrature phase shift keying modulated wave, and before and after the establishment of phase-locking, the output signals of the two means are so switched as to be supplied to the PLL circuit.

FIG. 1 is a circuit diagram of a carrier recovery phase-locked loop according to an embodiment of the invention. All components of the circuit are adapted for handling analog signals. Referring to FIG. 1, a received signal r(t) is an input at a receiving terminal 1 and is applied to two mixers 2 and 3. When a voltage controlled oscillator (VCO) 16 generates an output signal as indicated by $\cos \omega_c t$, the received signal r(t) is mixed with the VCO output signal $\cos \omega_c t$ at the mixer 2. The VCO output signal is 90° phase-shifted by a phase shifter 17 and mixed with the received signal r(t) at the mixer 3. An output signal of the mixer 2 is an input to an analog type binary/quadrature phase comparator's characteristic switching circuit 18 through a low-pass filter 4. An output signal of the mixer 3 is also applied to the analog type binary/quadrature phase comparator's characteristic switching circuit 18 through a low-pass filter 5. The analog type binary/quadrature phase comparator's characteristic switching circuit 18 then produces output signals which are selectively supplied to the VCO 16 through a loop filter 15.

Each of the mixers 2 and 3 is comprised of, for example, a double balanced mixer. The low-pass filters 4 and 5 are respectively adapted to cut off higher harmonic components generated by the mixers 2 and 3 and to shape the waveform of the received signal r(t). Each low-pass filter 4 or 5 is comprised of, for example, L, C and R elements or such an active filter as using an operational amplifier.

The loop filter 15 is also comprised of, for example, L, C and R elements or an active filter. For example, the VCO 16 is comprised of a voltage controlled quartz oscillator (VCXO) and the phase shifter 17 is comprised of L, C and R elements.

The analog type binary/quadrature phase comparator's characteristic switching circuit 18 comprises an adder 6 for adding an output signal i(t) of the low-pass filter 4 and an output signal q(t) of the low-pass filter 5, an adder 7 for subtracting the output signal q(t) of the low-pass filter 5 from the output signal i(t) of the low-pass filter 4, a multiplier 11 for multiplying the output signal i(t) of the low-pass filter 4 by the output signal q(t) of the low-pass filter 5, a multiplier 8 for multiplying an output signal i(t)+q(t) of the adder 6 by an output signal i(t)−q(t) of the adder 7, a sign detector 9 for detecting a sign of the output signal i(t)+q(t) produced from the adder 6, a sign detector 12 for detecting a sign of an output signal i(t)×q(t) produced from the multiplier 11, a multiplier 10 for multiplying the output signal i(t)−q(t) of the adder 7 by an output signal of the sign detector 9 to produce a product signal which is applied to a terminal A, a multiplier 13 for multiplying an output signal $i^2(t)-q^2(t)$ of the multiplier 8 by an output signal of the sign detector 12 to produce a product signal which is applied to a terminal B, and a switch 14 for selectively connecting the terminals A and B to the loop filter 15.

For example, each of the adders 6 and 7 is comprised of such an arithmetic circuit as using an operational amplifier, each of the multipliers 8, 10, 11 and 13 is comprised of a conventional analog multiplier or mixer, each of the sign detectors 9 and 12 is comprised of a comparator and the switch 14 is comprised of a conventional analog switch.

A Costas loop is effective for recovery of the carrier from the quadrature phase shift keying modulated wave and this type of PLL scheme is applied to the phase comparator's characteristic used in the present embodiment.

The Costas loop is detailed in, for example, a literature entitled "A Generalized "Polarity-Type" Costas Loop for Tracking MPSK Signals", IEEE Transactions on Communications, Vol. COM-30, No. 10, October 1982.

Where the transmission carrier is $e^{j\omega_c t}$ and the I and Q components of transmission data signal are represented by I(t) and Q(t), respectively, the received modulated wave r(t) is indicated by $$r(t) = I(t)\cos\omega_c t + Q(t)\sin\omega_c t.$$

Letting a phase difference reflecting the frequency offset and phase offset be $\theta(t)$, $\omega_c t$ is represented by $\omega'_c t + \theta(t)$ and there results, $$r(t) = I(t)\cos(\omega'_c t + \theta(t)) + Q(t)\sin(\omega'_c t + \theta(t)).$$

Pursuant to the usual Costas phase comparator's characteristic, for the VCO output signal being $\cos \omega_c t$, the base band components i(t) and q(t) are given by $$\begin{cases} i(t) = \frac{1}{2}(I(t)\cos\theta(t) + Q(t)\sin\theta(t)) \\ q(t) = \frac{1}{2}(Q(t)\cos\theta(t) - I(t)\sin\theta(t)) \end{cases}$$

and therefore the input signal to the loop filter 15 is required to be $$\text{Lin}(t) = \frac{1}{4}\sin 4\theta(t) \quad (1).$$

This phase comparator's characteristic is obviously sinusoidal. On the other hand, the phase comparator's characteristic adaptive to the binary phase shift keying modulated wave is $$\text{Lin}(t) = \frac{1}{2}\sin 2\theta(t) \quad (2).$$

Figure 3A:
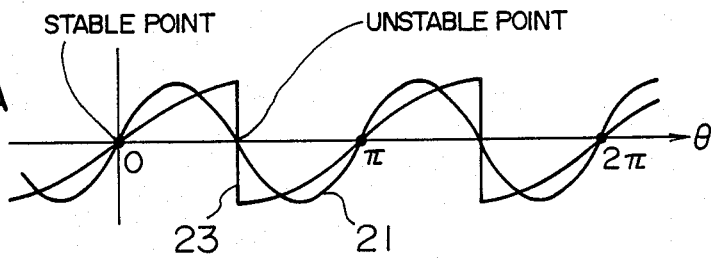
FIG. 3A is a diagrammatic representation for explaining a phase comparator's characteristic adapted for the binary phase shift keying modulated wave.
Figure 3B:
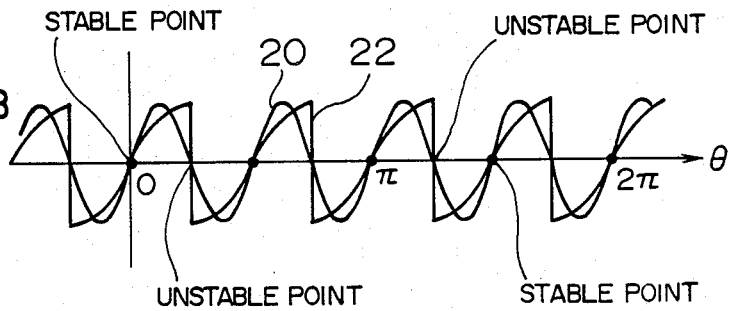
FIG. 3B is a diagrammatic representation for explaining a phase comparator's characteristic adapted for the quadrature phase shift keying modulated wave.

The phase comparator's characteristic of equation (1) is represented by a waveform 20 shown in FIG. 3B and the phase comparator's characteristic of equation (2) is represented by a waveform 21 shown in FIG. 3A.

In accordance with the present embodiment, during reception of the preamble, the phase comparator's characteristic indicated by equation (2) is supplied to the VCO 16 through the loop filter 15 to perform the carrier recovery and timing recovery and during data reception following establishment of the preamble, the phase comparator's characteristic indicated by equation (1) is supplied to the VCO 16 through the loop filter 15.

However, the direct use of the phase comparator's characteristics indicated by the above equations (1) and (2) will result in inconvenience because both of the characteristics have unstable points which lead to an asynchronous phenomenon. In performing high-speed pull-in operations, it is necessary that the asynchronous phenomenon be avoided or the probability of its occurrence be lowered. Thus, in the present embodiment, the sign detectors 9 and 12 are provided for producing the sign output signals by which the phase comparator's characteristics are multiplied so as to be converted into waveforms 23 and 22, respectively, as shown in FIGS. 3A and 3B. The converted phase comparator's characteristics having the waveforms 22 and 23 can make lower the probability of occurrence of the asynchronous phenomenon and they are indicated by For QPSK modulation: $(\frac{1}{4}\sin 2\theta(t) \times \text{sgn}(\cos 2\theta(t)))$ (3)

For BPSK modulation: $(\sin \theta(t) \times \text{sgn}(\cos \theta(t)))$ (4)

Accordingly, in the embodiment shown in FIG. 1, the switch 14 is transferred to the terminal A during the preamble reception and it is transferred to the terminal B near the end of the preamble, so that the phase comparator's characteristic can be switched from the characteristic waveform 23 of FIG. 3A to the characteristic waveform 22 of FIG. 3B. At that time, since the stable pull-in point in either characteristic does not shift, the establishment of phase-locking can be maintained. The switch 14 can be transferred in a manner as will be described below. Firstly, the received signal r(t) is applied to a band-pass filter 31 and an output signal of the band-pass filter 31 is compared, at a comparator 32, with an output signal of a threshold generator 33. When the output signal of the band-pass filter 31 exceeds a predetermined level, the comparator 32 sends an output signal to a timer 34, thereby informing the timer 34 of the arrival of the received signal. The comparator 32 and threshold generator 33 are provided for the sake of preventing an erroneous operation due to noise signals and the like, and the output threshold of the threshold generator 33 is set to a predetermined level in accordance with a noise level.

Since the duration of the preamble added as the heading to the transmission level is predetermined, the timer 34 permits the switch 14 to transfer from terminal A to terminal B after the lapse of predetermined time following the reception of the output signal from the comparator 32.

The manner of transferring the switch 14 is not limited to the above but for example, the switch 14 may be transferred by detecting the repetitive duration of the preamble.

Figure 4:
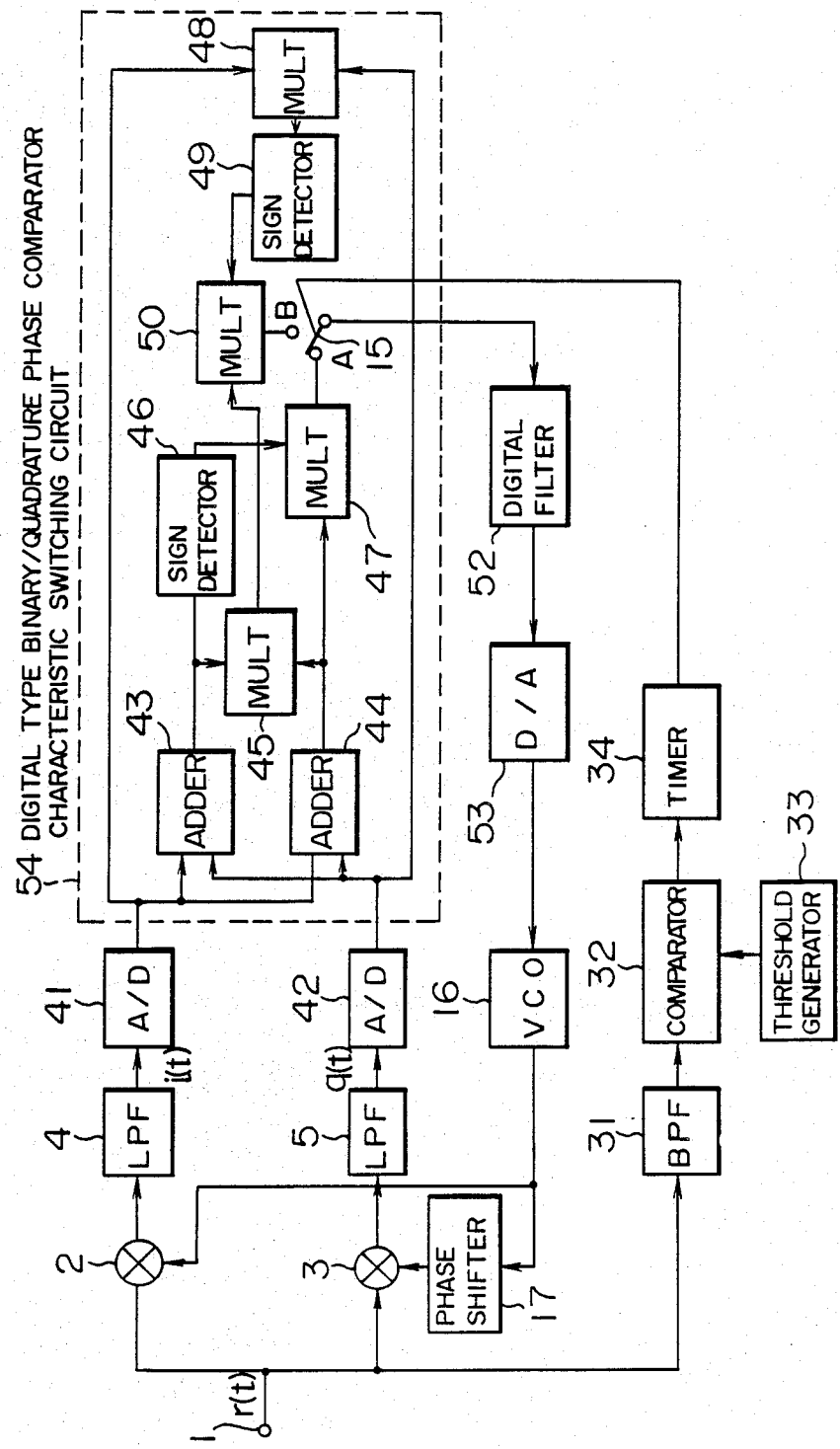
FIG. 4 is a circuit diagram illustrating a carrier recovery phase-locked loop according to a second embodiment of the invention.

Referring to FIG. 4, there is illustrated, in circuit diagram form, a carrier recovery phase-locked loop according to a second embodiment of the invention. In the embodiment of FIG. 4, a digital type binary/quadrature phase comparator's characteristic switching circuit 54 is realized with components for handling digital signals. In FIG. 4, identical components to those of FIG. 1 are designated by identical reference numerals. Output signals i(t) and q(t) delivered out of low-pass filters 4 and 5 are respectively converted by A/D converters 41 and 42 into digital signals which in turn are applied to the digital type binary/quadrature phase comparator's characteristic switching circuit 54. Functionally, adders 43 and 44, multipliers 45, 47, 48 and 50, sign detectors 46 and 49 and a switch 51 included in the digital type binary/quadrature phase comparator's characteristic switching circuit 54 correspond to the adders 6 and 7, multipliers 8, 10, 11 and 13, sign detectors 9 and 12 and switch 14 of FIG. 1, respectively. All of these digital components can be realized with a general-purpose IC (such as a TTL) or a DSP (digital signal processor) which has been used widely in recent years.

The output signal of the digital type binary/quadrature phase comparator's characteristic switching circuit is fed back to the VCO 16 through digital filter 52 and D/A converter 53.

By realizing the binary/quadrature phase comparator's characteristic switching circuit with a digital circuit as in the present embodiment, a compact and low-power consuming carrier recovery phase-locked loop be obtained.

As described above, according to the invention, the carrier can steadily be recovered from the digitized quadrature phase shift keying modulated burst-like received wave at high speeds and with low C/N ratios.

Especially, the binary phase shift keying modulated wave has noise-proof capability which is about 3 dB superior to that of the quadrature phase shift keying modulated wave and also has a margin of phase slip due to phase jitter which is 3 dB higher. Further, in the binary phase shift keying modulated wave, the number of unstable points appearing during the phase pull-in is halved as compared to the quadrature phase shift keying modulated wave and the hung-up probability can also be halved. Accordingly, the high-speed phase-locking can be accomplished with low C/N ratios.

Furthermore, the loop gain and the like factors can be switched in synchronism with switch-over of the binary/quadrature phase comparator's characteristic and a carrier recovery phase-locked loop having output characteristics complying with a variety of demands can be realized.

We claim:

1. A carrier recovery phase-locked loop comprising:
   a voltage controlled oscillator;
   a plurality of mixer means for receiving a digitized quadrature phase shift keying modulated burst wave added with a binary phase shift keying modulated preamble as a heading of said digitized quadrature phase shift keying modulated burst wave and arriving on time division basis and mixing the digitized quadrature phase shift keying modulated burst wave with an output signal of said voltage controlled oscillator;
   first means, responsive to output signals of said plurality of mixer means, for preparing a phase comparison characteristic signal adapted for a binary phase shift keying modulated wave;
   second means, responsive to the output signals of said plurality of mixer means, for preparing a phase comparison characteristic signal adapted for the quadrature phase shift keying modulated burst wave;
   a loop filter that feeds back an output signal of either said first means or said second means to said voltage controlled oscillator; and
   means for selectively supplying the output signals of said first means to said loop filter to establish a phase locked condition with respect to said preamble and upon establishment, supplying the output of said second means to said loop filter.

2. A carrier recovery phase-locked loop according to claim 1 wherein when the carrier of the digitized quadrature phase shift keying modulated wave is represented by $e^{[jw_c(t)+\theta(t)]}$, the binary phase comparison characteristic signal prepared by said first means is $Lin(t) = \frac{1}{2}\sin 2\theta(t)$ and the quadrature phase comparator's characteristic prepared by said second means is $Lin(t) = \frac{1}{8}\sin 4\theta(t).$ 3. A carrier recovery phase-locked loop comprising:
   a voltage controlled oscillator;
   a phase shifter for 90° shifting the phase of an output signal of said voltage controlled oscillator;
   a first mixer for receiving a digitized quadrature phase shift keying modulated burst wave added with a binary phase shift keying modulated preamble as a heading of said digitized quadrature phase shift keying modulated burst wave and arriving on time division basis to mix the digitized quadrature phase shift keying modulated wave with the output signal of said voltage controlled oscillator;
   a second mixer for receiving the digitized quadrature phase shift keying modulated burst wave added with said preamble to mix it with an output signal of said phase shifter;
   a first low-pass filter connected to said first mixer;
   a second low pass filter connected to said second mixer;
   a binary/quadrature phase comparison characteristic switching circuit for receiving output signals of said first and second low-pass filters to calculate a phase comparison characteristic signal adapted for a binary phase shift keying modulated wave and a phase comparison characteristic signal adapted for the quadratrue phase shift keying modulated wave and selectively delivering an output signal representative of either the binary phase comparison characteristic or the quadrature phase comparison characteristic;
   a loop filter that feeds back the output signal of said binary/quadrature phase comparison characteristic switching circuit to said voltage controlled oscillator; and
   means for instructing said binary/quadrature phase comparator's characteristic switching circuit to switch its output to said quadrature comparison characteristic signal after a phase locked condition with respect to the preamble has been established using said binary comparison characteristic signal.

4. A carrier recovery phase-locked loop according to claim 3 wherein said binary/quadrature phase comparison characteristic switching circuit comprises:
   a first adder for adding the output signal of said first low-pass filter and the output signal of said second low-pass filter;
   a second adder for subtracting the output signal of said second low-pass filter from the output signal of said first low-pass filter;
   a first multiplier for multiplying the output signal of said first low-pass filter by the output signal of said second low-pass filter;
   a second multiplier for multiplying an output signal of said first adder by an output signal of said second adder;
   a first sign detector for detecting a sign of the output signal of said first adder;
   a second sign detector for detecting a sign of an output signal of said first multiplier;
   a third multiplier for multiplying the output signal of said second adder by an output signal of said first sign detector;
   a fourth multiplier for multiplying an output signal of said second multiplier by an output signal of said second sign detector; and
   a switch, responsive to a transfer instruction signal produced from said means for instructing the switching circuit, that selectively supplies an output signal of said third multiplier and an output signal of said fourth multiplier to said loop filter.

5. A carrier recovery phase-locked loop according to claim 3 wherein said means for instructing switching comprises:
- a band-pass-filter for filtering the digitized quadrature phase shift keying modulated wave added with the preamble and arriving on time division basis;
- a threshold generator for generating a threshold of a predetermined level;
- a comparator for comparing an output signal of said band-pass filter with the output signal of said threshold generator and delivering an output signal when the output signal of said band-pass filter exceeds the predetermined level; and
- a timer for generating a transfer instruction signal after the lapse of predetermined time following reception of the output signal of said comparator.

6. A carrier recovery phase-locked loop comprising:
- a voltage controlled oscillator;
- a phase shifter for 90° shifting the phase of an output signal of said voltage controlled oscillator;
- a first mixer for receiving a digitized quadrature phase shift keying modulated burst wave added with a binary phase shift keying modulated preamble as a heading of said digitized quadrature phase shift keying modulated burst wave and arriving on time division basis to mix the digitized quadrature phase shift keying modulated wave with the output signal of said voltage controlled oscillator;
- a second mixer for receiving the digitized quadrature phase shift keying modulated wave added to said preamble to mix it with an output signal of said phase shifter;
- a first low pass filter connected to said first mixer;
- a second low pass filter connected to said second mixer;
- a first A/D converter for A/D converting an output signal of said first low-pass filter;
- a second A/D converter for A/D converting an output signal of said second low-pass filter;
- a binary/quadrature phase comparison characteristic switching circuit for receiving output signals of said first and second A/D converters to digitally calculate a phase comparison characteristic adapted for a binary phase shift keying modulated wave and a phase comparison characteristic adapted for the quadrature phase shift keying modulated wave and selectively delivering an output signal representative of either the binary phase comparison characteristic or the quadrature phase comparison characteristic;
- a digital filter that feeds back the output signal of said binary/quadrature phase comparison characteristic switching circuit to said voltage controlled oscillator;
- a D/A converter connected between said digital filter and said voltage controlled oscillator; and
- means for instructing said binary/quadrature phase comparison characteristic switching circuit to switch its output from said binary phase comparison characteristic signal to said quadrature phase comparison characteristic signal when a phase locked loop condition is established.

7. A carrier recovery phase-locked loop according to claim 6 wherein said binary/quadrature phase comparison characteristic switching circuit comprises:
- a first adder for adding the output signal of said first A/D converter and the output signal of said second A/D converter;
- a second adder for subtracting the output signal of said second A/D converter from the output signal of said second A/D converter;
- a first multiplier for multiplying the output signal of said first A/D converter by the output signal of said second A/D converter;
- a second multiplier for multiplying an output signal of said first adder by an output signal of said second adder;
- a first sign detector for detecting a sign of the output signal of said first adder;
- a second sign detector for detecting a sign of an output signal of said first multiplier;
- a third multiplier for multiplying the output signal of said second adder by an output signal of said first sign detector;
- a fourth multiplier for multiplying an output signal of said second multiplier by an output signal of said second sign detector; and
- a switch, responsive to a transfer instruction signal produced from said means for instructing switching, that selectively supplies an output signal of said third multiplier and an output signal of said fourth multiplier to said digital filter.

8. A carrier recovery phase-locked loop according to claim 6 wherein said means for instructing switching comprises:
- a band-pass filter for filtering the digitized quadrature phase shift keying modulated wave added with the preamble and arriving on time division basis;
- a threshold generator for generating a threshold of a predetermined level;
- a comparator for comparing an output signal of said band-pass filter with the output signal of said threshold generator and delivering an output signal when the output signal of said band-pass filter exceeds the predetermined level; and
- a timer for generating a transfer instruction signal after the lapse of predetermined time following reception of the output signal of said comparator.

* * * * *